Patented Dec. 2, 1947

2,432,041

UNITED STATES PATENT OFFICE 2,432,041

DYESTUFF PREPARATIONS CONTAINING AN ESTER SALT OF A LEUCO VAT DYESTUFF, A SALT OF A QUATERNARY AMMONIUM COMPOUND, AND AN ACID AMIDE

Roger Ratti, Neu-Allschwil, near Basel, and Philipp Brandt, Basel, Switzerland, assignors to Durand & Huguenin, S. A., Basel, Switzerland, a Swiss firm No Drawing. Original application May 4, 1942, Serial No. 441,752. Divided and this application November 29, 1943, Serial No. 512,246. In Switzerland May 5, 1941

9 Claims. (Cl. 8—35)

This invention relates to the preparation of dyestuff compositions for printing textile fibres containing ester salts of leuco vat dyestuffs and at least two assistants of two different species having a dispersing action on the ester salts, and more particularly to dyestuff compositions for printing textile fibres containing difficultly soluble ester salts of leuco vat dyestuffs and at least two assistants of two different species having a dispersing action on the ester salts.

Still more particularly it relates to dyestuff compositions containing as assistants having a dispersing action on the ester salts water-soluble stable salts of quaternary ammonium compounds containing at least one hydroxy group and further containing water-soluble acid amides as hereinafter defined.

Still more particularly it relates to dyestuff compositions containing, besides the ester salts of leuco vat dyestuffs, stable salts of quaternary ammonium compounds containing at least one hydroxy group and one ether linked oxygen atom and further containing water-soluble acid amides as hereinafter defined.

Further still more particularly it relates to printing compositions especially adapted for the application of difficultly soluble ester salts of leuco vat dyestuffs and to a process for printing textile fibres with these printing compositions.

The ester salts of leuco vat dyestuffs used in the present invention may be derived from the various series of known vat dyestuffs (for instance from indigoids, thioindigoids and all vat dyestuffs containing the anthraquinone nucleus system and others). Compositions of great value are obtained, when using salts of acid sulfuric acid esters of leuco vat dyestuffs, especially alkali salts which may be obtained in a stable powder form by known methods.

The printing of textile material with ester salts of leuco vat dyestuffs known in the trade as "Indigosols" is a well known art. It generally comprises dissolving the ester salt in water and a thickening agent, applying the printing paste to the fabric by known methods and fixing the insoluble vat dyestuff on the fibre by subsequent hydrolysis and oxidation, the hydrolysing and oxidising agents being added to the printing pastes.

It is the sulfuric acid ester group —SO₃H which in general confers the solubility in water on the ester salts of leuco vat dyestuffs. It appears, however, that this solubility varies widely according to the dyestuff which is to be used. Whilst some of the leuco ester salts are very easily soluble in water, others are considerably less soluble and easily salted out by electrolytes, for instance by the sodium and ammonium salts used as oxidising agents or as acid yielding agents. For this reason, in numerous cases it is necessary to add to the printing colours containing less soluble ester salts of leuco vat dyestuffs or ester salts which are easily salted out some quantities of organic solvent such as for instance $\omega:\omega'$-dihydroxydiethylsulfide, ethyleneglycol, sodium salt of benzyl sulfanilic acid and the like. However, certain vat dyestuffs yield ester salts which are so difficultly soluble in water, that practically it is impossible to use them for printing purposes, even with the assistance of usual solvents. In spite of the excellent properties, which such difficultly soluble ester salts may have, they are not of commercial significance. Of course, many attempts have been made to remedy this inconvenience, but a process giving full satisfaction in every respect has not yet been found.

It is now an object of this invention to produce novel dyestuff compositions and/or printing pastes particularly adapted for the printing of ester salts of leuco vat dyestuffs, and especially of difficultly soluble ester salts. Moreover, a further object of this invention consists in producing printing compositions containing the ester salts, especially the difficultly soluble ester salts, in a degree of dispersion optimum for printing.

It is still a further object to provide printing compositions containing the leuco ester salts precipitated in a finely divided form. It is still a further object to produce printing compositions containing the leuco ester salts dissolved in the printing paste. Moreover, a further object of this invention consists in providing printing compositions containing, besides a suitable oxidising agent and in some cases also an acid yielding agent, the leuco ester salts in a degree of dispersion optimum for printing. Finally, a still further object of this invention is to provide prints on fabrics distinguished by their evenness, their brilliancy of the shades and by a great dyeing power.

These and other objects of the invention are substantially accomplished by incorporating into a printing paste water-soluble salts of quaternary ammonium compounds containing at least one hydroxy group and further water-soluble acid amides as hereinafter defined. Of course, the said ammonium compounds can either directly be incorporated into the printing paste or they may first be mixed with the ester salt of a leuco vat dyestuff.

For the manufacture of the new preparations water-soluble, stable salts of quaternary organic ammonium bases containing at least one hydroxy group with inorganic or organic acids are suitable. The organic ammonium bases, which form the salts may contain aliphatic, aromatic, hydroaromatic and mixed aliphatic-aromatic radicals. The basic nitrogen atom may also form part of a heterocyclic nucleus which, besides the nitrogen atom, may contain other hetero atoms.

Any one of the aliphatic, aromatic, hydroaromatic and mixed aliphatic aromatic radicals may again be composed of different organic radicals which are linked amongst themselves not only directly by carbon-carbon links, but also for instance by bridges such as —O—; —S—; —NH—CO— or —NH—SO$_2$— and the like. Moreover, each of these radicals may contain other substituents.

The organic ammonium bases, which form salts, used for the dyestuff compositions of the present invention, may be derived from mono-, di- and polyamines. Polyvalent bases may contain side by side nitrogen atoms of a different degree of alkylation or arylation. Thus, for example, they may contain a tertiary amino group as well as a quaternary ammonium group.

For the manufacture of the new dyestuff compositions also mixtures of salts of different organic ammonium compounds and mixtures of different salts of an ammonium compound may be used.

Suitable salts of quaternary ammonium compounds may easily be obtained by known methods, for instance by quaternising tertiary alkylolamines with the aid of known quaternising agents, such as alkyl halides, aralkyl halides, dialkyl sulfates, paratoluene sulfonic acid esters and the like. There may also be used the reaction products of alkylene oxides with salts of tertiary amines or alkylolamines.

Especially good results are obtained with salts of quaternary ammonium compounds, containing besides hydroxy groups one or more ether linked oxygen atoms. These compounds may be obtained by known methods, for instance by causing alkylene oxides and/or bodies reacting in the same way, to react on quaternary ammonium compounds which contain one or more groups containing hydrogen atoms capable of reaction. It is also possible to introduce radicals containing ether linked oxygen atoms into the quaternary ammonium compounds. Furthermore, compounds which already contain ether linked oxygen atoms and which are suitable for the formation of ammonium compounds may be converted into quaternary ammonium compounds according to known methods.

As water-soluble acid amides the water-soluble amides of carboxylic acids and of carbonic acid are particularly suitable. It must be stated, that besides urea and its water-soluble substitution products also other water-soluble derivatives of urea or bodies containing the radical of urea, such as for example urethane, dicyanodiamide, biuret, hydantoin and their derivatives must be understood by the term "amides of carbonic acid." Water-soluble acid amides which have been found suitable for the purposes of the invention are for example formamide, acetamide, chloroacetamide, hydroxyacetamide, diethanoloxamide, tartaric acid amide, benzamide, toluene sulfonic acid amide and the aforesaid amides of carbonic acid.

Instead of water-soluble acid amides there may further be used as assistants in connection with the above cited salts of quaternary ammonium compounds certain substances containing hydroxy groups, such as furfuryl alcohol, $\omega:\omega'$-dihydroxydiethylsulfide and the like.

In certain cases mixtures of bodies containing hydroxy groups and acid amides in combination with water-soluble salts of quaternary ammonium compounds defined above have an excellent effect.

The salts of quaternary ammonium compounds enumerated above have an excellent dissolving action on ester salts, especially on difficulty soluble alkali salts of acid sulfuric acid esters of leuco vat dyestuffs. This fact may perhaps be explainable by the formation of a salt-like or additional compound between the leuco ester salt and the salt of a quaternary ammonium compound, but this explanation is only to be considered as hypothetical.

By adding to solutions of ester salts the usually required assistants for the development (oxidising agents and acid yielding agents), which assistants are generally electrolytes, the ester salts are precipitated in many cases from their solutions especially when using difficultly soluble ester salts. In presence of a salt of a quaternary ammonium compound and of a water-soluble acid amide and/or a substance containing hydroxy groups of the kind defined above, a precipitation of the ester salt can entirely be avoided or the precipitation can be regulated in such a way that the ester salts are dispersed in the printing paste in form of very finely divided particles. When, besides the salts of quaternary ammonium compounds, water-soluble acid amides and/or substances containing hydroxy groups are employed as second assistants, the quantity of the quaternary ammonium salt necessary in order to prevent a precipitation of the ester salt or to regulate this precipitation in the desirable way, can considerably be reduced. In many cases, the best regulation of the dispersion of the leuco ester salt can only be obtained by using besides the quaternary ammonium salts a second assistant as defined above.

By suitable selection of the salts of quaternary ammonium compounds and of the second assistant and by a proper dosage of the quantity of these substances to be added to the dyestuff compositions, the degree of dispersion of the various leuco ester salts can be adjusted in such a way that, for one ester salt and for the selected application and developing method, there may be obtained the best degree of dispersion giving in printing textile fibres the best yield in dyeing power, evenness and brilliancy.

According to the present invention the new dyestuff compositions can quite generally be prepared by mixing ester salts of leuco vat dyestuffs with salts of quaternary ammonium compounds and with second assistants of the above defined kind. It is evident that the quaternary ammonium salts and the second assistants can also be added when the printing paste is prepared. It is also possible to mix the second assistants with the dry powders of leuco ester salts and to add the required quantities of quaternary ammonium salts only when the printing paste is prepared.

It must be understood that also mixtures of different quaternary ammonium salts and second assistants of the above described types or mixtures of quaternary ammonium salts and second assistants with the assistants claimed in U. S. Patent No. 2,302,753 and in our copending application Serial No. 441,752 can be used.

Dyestuff compositions which contain besides the leuco ester salt and the salt of a quaternary ammonium compound of the above defined kind as second assistant a water-soluble acid amide and/or a substance containing hydroxy groups give in most of the cases prints which show a remarkable higher intensity and a better evenness and brilliancy than prints obtained under the same conditions with a dyestuff composition containing no second assistant.

It is a surprising fact that a dyestuff composition containing besides the leuco ester salts "$x$" parts of a mixture of assistants composed of "$y$" parts of a salt of a quaternary ammonium compound and "$z$" parts of a second assistant will give better results than a composition containing only "$x$" parts of a salt of a quaternary ammonium compound or "$x$" parts of a second assistant alone. This fact is of great practical value. It makes it possible to reduce considerably the quantity of the expensive salts of quaternary ammonium compounds used for the preparation of the dyestuff compositions without diminishing the qualities of the printing effect obtained.

We are aware that in the U. S. Patent 2,302,753 salts of primary to tertiary hydroxyalkylamines and of hydroxy ethyl ethers of primary to tertiary hydroxy alkylamines have been proposed as assistants for the printing of ester salts of leuco vat dyestuffs. In some of the examples, besides these assistants, there are also mentioned other assistants such as urea and phenol.

We are further aware that in the U. S. Patent 2,174,486 the use of salts of primary to teritary amines containing hydroxy groups with especially defined carboxylic acids have been proposed, also together with other assistants, for the printing of vat dyestuffs and of ester salts of leuco vat dyestuffs.

The salts of primary to tertiary hydroxy amines, which are proposed in the cited patents as assistants are distinguished from the salts of quaternary ammonium compounds of the present invention by the fact that they derive from organic bases containing trivalent nitrogen, whilst the salts of quaternary ammonium compounds used in accordance with the present invention derive from bases containing pentavalent nitrogen. As true ammonium compounds the latter have the great advantage over the salts of primary to tertiary hydroxy amines that they are stable towards alkalis and that they are not decomposed by a steaming process.

In U. S. Patent 2,174,486 salts of tetraethylammoniumhydroxide with especially defined carboxylic acids together with the customary assistants for the printing of vat dyestuffs are also proposed for the printing of ester salts of leuco vat dyestuffs. But these bodies, though deriving from a pentavalent nitrogen atom differ from the salts of quaternary ammonium compounds used in the present patent in that they do not contain solubilising groups, especially hydroxy groups. Even when used together with acid amides as assistants the salts of tetraethylammoniumhydroxide give results which are considerably inferior to those obtained with the claimed salts of quaternary ammonium compounds. It is a known fact that the quaternary ammonium salts containing no solubilising group, even when employed together with the other assistants cited in U. S. Patent 2,174,486, precipitate the ester salts of the leuco vat dyestuffs in such a form that it is impossible to obtain useful prints. The prints thus obtained are uneven and show dull and weak shades.

Moreover, it is a known fact that quaternary ammonium compounds, even containing hydroxy groups can be used for forming insoluble or at least difficultly soluble salts with the leuco sulfuric acid esters (U. S. Patents 2,061,860, 2,180,809 and 2,182,140).

It could therefore generally not be foreseen that quaternary ammonium compounds even containing hydroxy groups and even used together with other assistants, could successfully be employed as assistants enhancing the dispersion and the solubility respectively of difficultly soluble ester salts of leuco vat dyestuffs.

The present invention will further be described in connection with the following specific examples in which the parts are by weight and which are given in order to illustrate this invention. The present invention is not limited to these examples. Changes may be made in the selection of the leuco ester salts, of the salts of the quaternary ammonium compounds and of the water-soluble acid amides and/or substances containing hydroxy groups of the species defined above and in their proportions, in the manipulation steps and other conditions, without departing from the scope of the appended claims.

*Example 1*

40 parts of the sodium salt of the acid sulfuric acid ester of leuco-2:1-naphththioindigo, corresponding to 50% of vat dyestuff, are mixed with 50 parts of the addition product of 1 molecule of dimethyl sulfate on 1 molecule of the trihydroxyethyl ether of triethanolamine and 100 parts of urea.

With the dyestuff composition thus obtained a printing paste according to the nitrite process may be made up for instance as follows:

190 parts of the dyestuff composition are dissolved by heating with 280 parts of water and 500 parts of a starch tragacanth thickening. The solution thus obtained is cooled down to 40° C, whilst stirring. Then 30 parts of a 30% solution of sodium nitrite are added and the mixture is cooled down to room temperature. The printing paste obtained contains the ester salt of leuco vat dyestuff precipitated in form of very fine particles.

If a textile fibre, e. g. cotton, is printed with this printing paste and developed after drying by passing for 8 seconds at 70° C. through a bath containing 20 ccm. of sulfuric acid of 96% per liter, there are obtained, after the usual washing and soaping, even, dark brown prints.

In this example the addition product of dimethyl sulfate on the trihydroxyethylether of triethanolamine may be replaced with substantially the same results by the addition product of diethyl sulfate on the same ether or by the addition product of 2 molecules of dimethyl sulfate on 1 molecule of the tetrahydroxy-polyethylether which can be obtained by the interaction of 8 molecules of ethylene oxide on tetraethanolethylenediamine in an aqueous solution, moreover, the urea may be replaced by formamide or acetamide.

*Example 2*

40 parts of the sodium salt of the acid sulfuric acid ester of leuco-2:1-naphththioindigo, corresponding to 50% of vat dyestuff, are mixed with 50 parts of the addition product of 1 molecule of dimethyl sulfate on 1 molecule of the trihydroxyethylether of triethanolamine, 20 parts of urea and 20 parts of a Turkey red oil.

With the dyestuff composition thus obtained a printing colour may be made up according to a steaming process for instance as follows:

130 parts of the dyestuff composition are dissolved by heating with 280 parts of water and 500 parts of a starch tragacanth thickening. The solution obtained is cooled down whilst stirring. Then 30 parts of a 50% ammonium sulfocyanide solution, 40 parts of a 25% sodium chlorate solution, 10 parts of a 1% ammonium vanadate solution and 10 parts of 22% ammonia are added under stirring. The ester salt is precipitated in the printing paste thus obtained in a very finely divided form.

By printing on cotton or rayon, drying, steaming for 8 minutes, washing and soaping at the boil, deep, even brown prints will be obtained.

In this example urea may be replaced by urethane, by asymmetrical diethylurea or by 5:5-dimethyl-hydantoin without changing the printing results.

*Example 3*

The following printing composition is made up:

40 parts of the sodium salt of the acid sulfuric acid ester of leuco-2:1-naphththioindigo corresponding to 50% of vat dyestuff, are dissolved by heating with 180 parts of water, 100 parts of urea, 60 parts of the diethylester of tartaric acid and 500 parts of a starch tragacanth thickening. 50 parts of the addition product of 1 molecule of dimethyl sulfate on 1 molecule of the trihydroxyethylether of triethanolamine are added, whilst stirring, to the warm solution, whereupon the latter is cooled down. Then 40 parts of a 25% sodium chlorate solution, 20 parts of a 1% ammonium vanadate solution and 10 parts of 22% ammonia are added. A preparation containing the ester salt in solution is thus obtained.

When cotton is printed with this preparation and treated as described in Example 2, there is obtained a full, brown print.

*Example 4*

40 parts of the sodium salt of the acid sulfuric acid ester of leuco-dibromoanthanthrone, corresponding to 50% of vat dyestuff, are mixed with 50 parts of the addition product of 1 molecule of dimethyl sulfate on 1 molecule of the trihydroxyethylether of triethanolamine and 120 parts of dicyanodiamide.

With the dyestuff composition thus obtained a printing paste may be made up for instance as follows according to the nitrite process:

210 parts of the dyestuff composition are dissolved in the heat with 240 parts of water and 500 parts of a neutral starch tragacanth thickening and the solution is cooled down whilst stirring. Then 30 parts of a 30% sodium nitrite solution and 20 parts of a 10% sodium carbonate solution are added. The printing colour thus obtained contains the ester salt in solution.

When cotton is printed with this printing colour and treated as described in Example 1, an even, full and bright red orange print is obtained.

In this example, the dicyanodiamide may be replaced with the same result by urea.

*Example 5*

40 parts of the sodium salt of the acid sulfuric acid ester of leuco dibromoanthanthrone, corresponding to 50% of vat dyestuff, are mixed with 50 parts of the addition product of 1 molecule of dimethyl sulfate on 1 molecule of the trihydroxyethylether of triethanolamine and 100 parts of urea.

According to a steaming process a printing colour may be made up with the so-obtained dyestuff composition for instance as follows:

190 parts of the dyestuff composition are dissolved by heating with 240 parts of water and 500 parts of a neutral starch tragacanth thickening. The solution is cooled down whilst stirring. Then 20 parts of a 50% ammonium sulfocyanide solution, 30 parts of a 25% sodium chlorate solution and 20 parts of a 1% ammonium vanadate solution are added whilst stirring, whereby the ester salt is precipitated in a finely divided form.

When cotton or viscose rayon is printed with this printing colour and treated as described in Example 2, an even, deep and bright red orange print is obtained.

In this example the 50 parts of the quaternary addition product and the 100 parts of urea may be replaced with the same result by 70 parts of the hydroxyethylether of the N-hydroxyethylpyridinium chloride and 140 parts of urea.

*Example 6*

40 parts of the sodium salt of the acid sulfuric acid ester of leuco-6:6'-dichloro-4:4'-dimethylthioindigo, corresponding to 50% of vat dyestuff, are mixed with 30 parts of the addition product of 1 molecule of dimethyl sulfate on 1 molecule of the trihydroxyethylether of triethanolamine and with 200 parts of urea.

With the dyestuff composition thus obtained a printing paste may be made up according to the nitrite process for instance as follows:

270 parts of the dyestuff composition are dissolved by heating with 300 parts of water and 500 parts of a neutral starch tragacanth thickening. The solution is cooled down and 80 parts of a 30% sodium nitrite solution and 20 parts of a 10% sodium carbonate solution are added. The printing paste thus obtained contains the ester salt precipitated in a finely divided form.

When cotton or viscose rayon are printed with this printing paste and when the dried prints are steamed for 4 minutes and then treated as described in Example 1, a strong, bright pink shade is obtained.

*Example 7*

40 parts of the sodium salt of the acid sulfuric acid ester of leuco-dichloranthanthrone, corresponding to 50% of vat dyestuff, are mixed with 80 parts of N-hydroxyethylpyridiniumchloride and 100 parts of urea.

With the dyestuff composition thus obtained a printing colour may be made up according to a steaming process for instance as follows:

220 parts of the dyestuff composition are dissolved by heating with 150 parts of water and 500 parts of a neutral starch tragacanth thickening. The solution is cooled down under stirring. Then 30 parts of a 50% ammonium sulfocyanide solution, 80 parts of a 25% sodium chlorate solution and 20 parts of a 1% ammonium vanadate solution are added. A printing paste containing the ester salt precipitated in a finely divided form is thus obtained.

This printing paste contains the ester salt in solution.

When cotton is printed with this printing paste and treated as described in Example 2, a bright and strong orange print is obtained.

In this example the 80 parts of N-hydroxyethylpyridiniumchloride may be replaced with the same result by 50 parts of the addition product of 1 molecule of dimethyl sulfate on 1 molecule of the trihydroxyethylether of the triethanolamine.

*Example 8*

40 parts of the sodium salt of the acid sulfuric acid ester of leuco-dichloroanthanthrone, corresponding to 50% of vat dyestuff, are mixed with 50 parts of N-hydroxyethylpyridiniumchloride and 50 parts of urea.

With the dyestuff composition thus obtained a printing paste may be made up according to the nitrite process for instance as follows:

140 parts of the dyestuff composition are dissolved by heating with 310 parts of water and 500 parts of a neutral starch tragacanth thickening. The solution is cooled down and 30 parts of a 30% sodium nitrite solution and 20 parts of a 10% sodium carbonate solution are added, whereby the ester salt is precipitated in a very finely divided form.

When cotton or viscose rayon are printed with this printing paste and treated as described in Example 1, a strong, bright orange shade is obtained.

In this example the 50 parts of N-hydroxyethylpyridiniumchloride may be replaced with the same result by 50 parts of the addition product of 1 molecule of dimethyl sulfate or diethyl sulfate on 1 molecule of the trihydroxyethylether of triethanolamine and the 50 parts of urea by 80 parts.

*Example 9*

40 parts of the sodium salt of the acid sulfuric acid ester of leuco-2:1-6:5-anthraquinone-diphenylthiazol, corresponding to 50% of vat dyestuff, are mixed with 70 parts of 1 molecule of dimethyl sulfate on 1 molecule of the trihydroxyethylether of triethanolamine and 70 parts of urea.

With the dyestuff composition thus obtained a printing colour may be made up according to a steaming process for instance as follows:

180 parts of the dyestuff composition are dissolved by heating with 220 parts of water and 500 parts of a neutral starch tragacanth thickening. This solution is then cooled down. Then 40 parts of a 50% ammonium sulfocyanide solution, 50 parts of a 25% sodium chlorate solution and 10 parts of a 1% ammonium vanadate solution are added whilst stirring, the ester salt being thus precipitated in a very finely divided form.

When cotton or rayon is printed with this printing colour and treated in the manner described in Example 2, and even, strong and bright canary yellow shade is obtained.

In this example the urea may be replaced with substantially the same results by diethanoloxamide. Furthermore, the 70 parts of the quaternary addition product may be replaced by 70 parts of the addition product of 2 molecules of dimethyl sulfate on 1 molecule of asymmetrical diethyl-diethanolethylenediamine or by 70 parts of the addition product of 1 molecule of dimethyl sulfate on 1 molecule piperidine-N-hydroxy-triethylether or by 70 parts of the addition product of 1 molecule of dimethyl sulfate on 1 molecule of morpholine-N-hydroxyethylether or by 70 parts of the hydroxyethylether of the hydroxyethylpyridiniumchloride. In this latter instance the quantity of urea must be increased to 140 parts.

Moreover, the 70 parts of the quaternary addition product and the 70 parts of urea may be replaced by 50 parts of the addition product of 1 molecule of methylchloride on 1 molecule of the trihydroxyethylether of triethanolamine and 50 parts of urea or by 50 parts of the addition product of 2 molecules of dimethyl sulfate on 1 molecule of the tetrahydroxypolyethylether, which may be obtained by the action of 8 molecules of ethylene oxide on tetraethanolethylenediamine in an aqueous solution and 100 parts of urea.

*Example 10*

40 parts of the sodium salt of the acid sulfuric acid ester of leuco-2:1-6:5-anthraquinone-diphenylthiazol, corresponding to 50% of vat dyestuff, are mixed with 50 parts of tetraethanolammoniumchloride and 100 parts of urea.

With the dyestuff composition thus obtained a printing paste may be made up according to the nitrite process for instance as follows:

190 parts of the dyestuff composition are dissolved by heating with 250 parts of water and 500 parts of a neutral starch tragacanth thickening. The solution is cooled down. Then 40 parts of a 30% sodium nitrite solution and 20 parts of a 10% sodium carbonate solution are added. The printing paste thus obtained contains the ester salt precipitated in a very finely divided form.

When cotton or rayon is printed with this printing paste and treated as described in Example 1, a bright and strong yellow print is obtained. In this example the tetraethanolammoniumchloride can be replaced with the same results by the addition product of 2 molecules of dimethyl sulfate on 1 molecule of asymmetrical diethyldiethanol-ethylenediamine or by the addition product of 1 molecule of dimethyl sulfate on 1 molecule of piperidine-N-hydroxytriethylether or by the addition product of 1 molecule of dimethyl sulfate on 1 molecule of morpholine-N-hydroxyethylether. In the latter instance it is suitable to steam the prints for 4 minutes before developing the same.

Furthermore, the 50 parts of tetra-ethanolammoniumchloride and the 100 parts of urea may be replaced by 20 parts of the addition product of 1 molecule of dimethyl sulfate on 1 molecule of the hydroxyethylether of triethanolamine and 40 parts of chloracetamide or by 20 parts of the hydroxyethylether of the hydroxyethylpyridiniumchloride and 40 parts of dicyanodiamide. In the latter case it is recommended to steam the prints for 4 minutes before developing them.

*Example 11*

100 parts of an aqueous paste of the sodium salt of the acid sulfuric acid ester of the leuco-tribromoisodibenzanthrone obtained by bromination of isodibenzanthrone in sulfuric acid monohydrate, corresponding to 20% of vat dyestuff, are mixed with 50 parts of the addition product of 1 molecule of methylchloride on 1 molecule of the trihydroxyethylether of triethanolamine and with 150 parts of urea.

With this dyestuff composition thus obtained a printing colour may be made up according to a steaming process for instance as follows:

300 parts of the dyestuff composition are dissolved by heating with 120 parts of water and 500 parts of a starch tragacanth thickening and the solution is cooled down. Then 40 parts of a 50% ammonium sulfocyanide solution, 30 parts of a 25% sodium chlorate solution and 10 parts of a 1% ammonium vanadate solution are added whilst stirring. The printing paste thus obtained contains the ester salt in solution.

When cotton or rayon is printed with this printing paste and treated as described in Example 2, a bright, violet print is obtained.

Example 12

100 parts of an aqueous solution of the sodium salt of the acid sulfuric acid ester salt of leuco-tribromoisodibenzanthrone obtained by bromination of isodibenzanthrone in sulfuric acid monohydrate, corresponding to 20% of vat dyestuff, are mixed with 40 parts of the addition product of 1 molecule of methyl chloride on 1 molecule of the trihydroxyethylether of triethanolamine and 120 parts of urea.

With the dyestuff composition thus obtained a printing paste may be made up according to the nitrite process for instance as follows:

260 parts of the dyestuff composition are dissolved by heating with 70 parts of water and 600 parts of a neutral starch tragacanth thickening and the solution cooled down. Then 50 parts of a 30% sodium nitrite solution and 20 parts of a 10% sodium carbonate solution are added whilst stirring. The printing paste thus obtained contains the ester salt in solution.

When cotton or rayon is printed with this printing paste and treated as described in Example 1, a deep, brilliant violet print is obtained.

Example 13

50 parts of the sodium salt of the acid sulfuric acid ester of leuco-dichloroisodibenzanthrone, corresponding to 40% of vat dyestuff, are mixed with 30 parts of the addition product of 1 molecule of dimethyl sulfate on 1 molecule of the trihydroxyethylether of triethanolamine and with 50 parts of urea.

With the dyestuff composition thus obtained a printing paste may be made up according to the nitrite process for instance as follows:

130 parts of the dyestuff composition are dissolved by heating with 320 parts of water and 500 parts of a neutral starch tragacanth thickening and the solution is cooled down. Then 30 parts of a 30% sodium nitrite solution and 20 parts of a 10% sodium carbonate solution are added whilst stirring, whereby the ester salt precipitates in a very finely divided form.

When cotton or rayon is printed with this printing paste and treated as described in Example 1, an even, violet print is obtained.

Example 14

60 parts of the sodium salt of the acid sulfuric acid ester of leuco-dibromo-3:4-8:9-dibenzpyrenequinone, corresponding to 30% of vat dyestuff, are mixed with 30 parts of the addition product of 1 molecule of dimethyl sulfate on 1 molecule of the trihydroxyethylether of triethanolamine and 60 parts of urea.

With the dyestuff composition thus obtained a printing paste may be made up according to the nitrite process for instance as follows:

150 parts of the dyestuff composition are dissolved by heating with 300 parts of water and 500 parts of a starch tragacanth thickening. The solution is cooled down. Then 30 parts of a 30% sodium nitrate solution and 20 parts of a 10% sodium carbonate solution are added, whereby the ester salt is precipitated in form of very finely divided particles.

When cotton or rayon is printed with the printing paste thus prepared and treated as described in Example 1, an even, bright and strong golden yellow print is obtained.

Example 15

80 parts of the sodium salt of the acid sulfuric acid ester of leuco-pyranthrone in form of an aqueous paste corresponding to 25% of leuco vat dyestuff are mixed with 100 parts of the addition product of 1 molecule of dimethyl sulfate on 1 molecule of the trihydroxyethylether of triethanolamine and with 50 parts of urea.

With the dyestuff composition thus obtained a printing paste may be made up according to the nitrite process for instance as follows:

230 parts of the dyestuff composition are dissolved by heating with 220 parts of water and 500 parts of a neutral starch tragacanth thickening and the solution is cooled down. Then 30 parts of a 30% sodium nitrite solution and 20 parts of a 10% sodium carbonate solution are added whilst stirring. The printing colour thus obtained contains the ester salt precipitated in a very finely divided form.

When cotton is printed with this printing colour and treated as described in Example 1, there is obtained an even orange print.

In this example urea can be replaced with the same results by $\varpi:\varpi'$-dihydroxydiethylsulfide.

This application is a division of our application Ser. No. 441,752, filed on May 4, 1942.

What we claim is:

1. A dyestuff composition for printing textile fibres, comprising an ester salt of a leuco vat dyestuff, a water-soluble acid amide, and a water-soluble stable salt of a quaternary ammonium base with an acid selected from the group consisting of inorganic acids, methyl sulfuric acid, ethyl sulfuric acid and p-toluene sulfonic acid, at least one substituent of the formula

wherein $n$ is one of the integers 1 and 2, being attached to the quaternary ammonium nitrogen atom.

2. A dyestuff composition for printing textile fibres, comprising a difficultly soluble ester salt of a leuco vat dyestuff, a water-soluble acid amide, and a water-soluble stable salt of a quaternary ammonium base with an acid selected from the group consisting of inorganic acids, methyl sulfuric acid, ethyl sulfuric acid and p-toluene sulfonic acid, at least one substituent of the formula

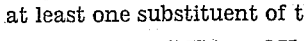

wherein $n$ is one of the integers 1 and 2, being attached to the quaternary ammonium nitrogen atom.

3. A dyestuff composition for printing textile fibres, comprising an ester salt of a leuco vat dyestuff, a water-soluble carboxylic acid amide, and a water-soluble stable salt of a quaternary ammonium base with an acid selected from the group consisting of inorganic acids, methyl sulfuric, ethyl sulfuric acid and p-toluene sulfonic acid, at least one substituent of the formula $$-C_2H_4-(O-C_2H_4)_n-OH$$

wherein $n$ is one of the integers 1 and 2, being attached to the quaternary ammonium nitrogen atom.

4. A dyestuff composition for printing textile fibres, comprising an ester salt of a leuco vat dyestuff, a water-soluble urea compound and a water-soluble stable salt of a quaternary ammonium base with an acid selected from the group consisting of inorganic acids, methyl sulfuric acid, ethyl sulfuric acid and p-toluene sulfonic acid, at least one substituent of the formula $$-C_2H_4-(O-C_2H_4)_n-OH$$

wherein $n$ is one of the integers 1 and 2, being attached to the quaternary ammonium nitrogen atom.

5. A dyestuff composition for printing textile fibres, comprising an ester salt of a leuco vat dyestuff, urea, and a water-soluble stable salt of a quaternary ammonium base with an acid selected from the group consisting of inorganic acids, methyl sulfuric acid, ethyl sulfuric acid and p-toluene sulfonic acid, at least one substituent of the formula $$-C_2H_4-(O-C_2H_4)_n-OH$$

wherein $n$ is one of the integers 1 and 2, being attached to the quaternary ammonium nitrogen atom.

6. A dyestuff composition for printing textile fibres, comprising an ester salt of a leuco vat dyestuff, the trihydroxyethylether of methyltriethanol-ammonium-methyl-sulfonate, and a water-soluble acid amide.

7. A dyestuff composition for printing textile fibres comprising an ester salt of a leuco vat dyestuff, the hydroxyethylether of hydroxyethylpyridinium chloride, and a water-soluble acid amide.

8. A dyestuff composition for printing textile fibres, comprising an ester salt of a leuco vat dyestuff, the trihydroxyethylether of methyltriethanol-ammonium-methyl-sulfonate, and urea.

9. A dyestuff composition for printing textile fibres comprising an ester salt of a leuco vat dyestuff, the hydroxyethylether of hydroxyethylpyridinium chloride, and dicyanodiamide.

ROGER RATTI.
PHILIPP BRANDT.

REFERENCES CITED

The following references are of record in the file of this patent:

UNITED STATES PATENTS

| Number | Name | Date |
| --- | --- | --- |
| 2,003,960 | Tonkin | June 4, 1935 |
| 2,041,220 | Zeh | May 19, 1936 |
| 2,079,788 | Chambers | May 11, 1937 |
| 2,122,113 | Ratti | June 28, 1938 |
| 2,160,119 | Brodersen | May 30, 1939 |
| 2,184,495 | Graenecher | Dec. 26, 1935 |
| 2,193,749 | Tschan | Mar. 12, 1940 |
| 2,211,126 | Kern | Aug. 13, 1940 |
| 2,214,352 | Schoeller | Sept. 10, 1940 |
| 2,224,280 | Verity | Dec. 10, 1940 |
| 2,302,753 | Duport | Nov. 24, 1942 |
| 2,267,609 | Kern | Dec. 23, 1941 |

FOREIGN PATENTS

| Number | Country | Date |
| --- | --- | --- |
| 428,701 | Great Britain | May 17, 1935 |